(12) United States Patent
Matos Ricardo et al.

(10) Patent No.: US 9,296,281 B2
(45) Date of Patent: Mar. 29, 2016

(54) CABRIO BUS FOR PASSENGER TRANSPORT

(71) Applicants: Augustinus Maria Verachtert, Arnhem (NL); Helder Jorge Da Silva Ricardo, Braga (PT); Luis Antonio Da Silva Ricardo, Braga (PT)

(72) Inventors: Carlos Alberto Matos Ricardo, Maia (PT); Geertruida Anna Petronella Maria Lammers, Maia (PT)

(73) Assignee: Augustinus Maria Verachtert, Arnhem (NL)

( * ) Notice: Subject to any disclaimer, the term of this patent is extended or adjusted under 35 U.S.C. 154(b) by 0 days.

(21) Appl. No.: 14/371,779

(22) PCT Filed: Sep. 17, 2012

(86) PCT No.: PCT/NL2012/050654
§ 371 (c)(1),
(2) Date: Jul. 11, 2014

(87) PCT Pub. No.: WO2013/105847
PCT Pub. Date: Jul. 18, 2013

(65) Prior Publication Data
US 2014/0354015 A1 Dec. 4, 2014

(30) Foreign Application Priority Data

Jan. 13, 2012 (NL) .................................... 2008118

(51) Int. Cl.
*B62D 47/02* (2006.01)
*B60J 7/02* (2006.01)
(Continued)

(52) U.S. Cl.
CPC ................ *B60J 7/026* (2013.01); *B60J 7/0092* (2013.01); *B60J 10/0037* (2013.01); *B60J 10/12* (2013.01); *B62D 31/02* (2013.01); *B62D 47/00* (2013.01)

(58) Field of Classification Search
CPC ......... B60J 7/047; B62D 31/00; B62D 31/02; B62D 31/025; B62D 31/04; B62D 47/02
USPC .............................................. 296/178, 220.01
See application file for complete search history.

(56) References Cited

U.S. PATENT DOCUMENTS 1,831,907 A    11/1931  Hart
4,784,429 A *  11/1988  Hodges ......................... 296/165
(Continued)

FOREIGN PATENT DOCUMENTS

DE       4212262 A1    10/1993
DE       10139983 A1   10/2002
(Continued)

OTHER PUBLICATIONS

International Search Report and Written Opinion for PCT/NL 2012/050654 dated Feb. 4, 2013.

*Primary Examiner* — Dennis H Pedder
(74) *Attorney, Agent, or Firm* — Shumaker, Loop & Kendrick, LLP (57) ABSTRACT

The present invention relates to a hardtop bus having at least six seats. The bus includes a chassis and a body with a U-shaped roof construction, which covers at least some of the seats of the bus. The roof construction can be retractable over at least some of the at least six seats such that the U-shaped roof construction has an open and closed position. The U-shaped roof construction comprises at least two substantially shape retaining, nestable roof elements having a U-shaped cross-section, which are movable relative to each other and which are positioned at least substantially one behind another, at least in the closed position.

9 Claims, 9 Drawing Sheets

(51) Int. Cl.
*B60J 10/00* (2006.01)
*B60J 10/12* (2006.01)
*B60J 7/00* (2006.01)
*B62D 31/02* (2006.01)
*B62D 47/00* (2006.01)

(56) References Cited

U.S. PATENT DOCUMENTS 5,421,635 A * 6/1995 Reinsch et al. .......... 296/220.01
6,314,734 B1 * 11/2001 Enander ...................... 60/602
6,851,741 B1   2/2005 Burg
2006/0273624 A1 * 12/2006 Romano ...................... 296/178
2011/0316302 A1 * 12/2011 Lenz, Jr. .................. 296/100.03

FOREIGN PATENT DOCUMENTS

EP   2272700 A1   1/2011
FR   1530465 A    6/1968
GB   349172 A     5/1931
GB   360160 A     11/1931

* cited by examiner

CABRIO BUS FOR PASSENGER TRANSPORT

CROSS-REFERENCE TO RELATED APPLICATION

This U.S. National Stage Application claims priority from PCT/NL2012/050654 filed on Sep. 17, 2012, which claims priority from NL 2008118 filed on Jan. 13, 2012, the entirety of which are incorporated herein by reference.

TECHNICAL FIELD AND BACKGROUND OF THE INVENTION

The present invention relates to a bus of the hardtop type having at least ten seats and comprising a chassis and a body with an at least substantially U-shaped roof construction, which covers at least some of the seats of the bus, which roof construction can be removed, and be replaced again, over at least some of the at least ten seats. Unless explicitly stated otherwise, the term "remove" as used herein is understood to mean removing the cover from its original, seat-covering position. Furthermore preferably, the bus has at least thirteen seats, so that the bus will be suitable for group transport or for touristic purposes.

Such a bus is known as a cabrio bus. The known cabrio bus has a substantially U-shaped roof construction, which is detachably attached to the bus body. Upon conversion of the known cabrio bus from a closed bus to an open bus, the roof construction is detached and the roof construction, or at least the removable part thereof, is removed from the body and temporarily stored outside the bus. The cabrio bus can now be used with an open roof. When the roof of the cabrio bus is to be closed, the bus is driven to the location where the removable part of the roof construction is temporarily stored. At that location, the roof construction is placed on the body again and attached thereto.

A drawback of the known cabrio bus is the fact that the conversion from a closed roof state to and open roof state, and vice versa, is a relatively laborious job. In addition, the removable part of the roof construction is separated from the bus, so that the roof construction is not available for being placed back in the case of a sudden change of the weather.

Accordingly it is the object of the present invention to provide a bus as described in the introduction which is easier to convert between a closed roof state and an open roof state and/or which remains with the bus also in the open position of the roof.

This object is achieved by the present invention in that the substantially U-shaped roof construction comprises at least two substantially shape retaining, nestable roof elements of at least substantially U-shaped cross-section, which are movable relative to each other and which are positioned at least substantially one behind another, at least in the covering position, with the legs of the U-shaped cross-section extending downwards the windows present in the roof construction. Usually, such windows will be provided in the downwardly extending side panels that correspond to the legs of the U-shape. The shape of the roof elements distinguishes the cabrio bus according to the present invention from, inter alia, buses of the sliding roof type, in which only a part of the roof located above windows present in the bus can be moved. A sliding roof reduces the structural strength of a bus significantly less than does an open roof, or at least a roof that can be opened. Moreover, a movable roof comprising side panels that extend relatively far downwards makes higher demands on the seal between moving parts than does a sliding roof.

The characteristic aspects of the present invention make it possible to store the nestable roof elements in a nested position in or on the bus in the non-covering position, as a result of which one or more roof elements can be removed from their original position by being moved from an original, covering position to a nested position. This is realised without the storage thereof objectionably taking up any space, or at least hardly any space, for any passengers in the bus. Thus, the roof elements that have been removed from their covering position can be carried along by the bus at all times, also in their removed position. The object of the present invention is thus achieved, at least partially so. The term "non-covering position" of a roof element is understood to mean the position of the roof element in which the roof element does not cover the original part of the bus. Nested roof elements may jointly cover another part of the bus, however.

Passenger cars of the hardtop convertible type in which the roof elements can be stored in a compact manner in relation to each other in the open position of the roof do exist, to be true, but insofar as the relative position of the roof elements in that state may be regarded as nested, there is this important difference that vehicles comprising fewer seats, as a rule no more than two rows of seats, are concerned in that case. The removable part of the roof construction is relatively small. Because of the relatively small size of such a passenger car, its movable roof construction does not have to meet high requirements.

A known convertible of the passenger car type comprises a hinged frame provided with a flexible fabric, wherein the fabric, which functions as a roof, can be folded open by swinging hinging elements of the hinged frame rearwards, seen in the driving direction of the car. The fabric folds onto itself, so that it will take up relatively little space in the open position of the roof. This is not a hardtop convertible type, however. A drawback of such a roof is the fact that the construction is not shape-retaining and that weather influences are relatively easily noticeable by the occupants also in the closed position of the roof construction. In addition, the windows of the removable part of the roof construction are less suitable for looking out therethrough in the closed position of the bus. They are made of a flexible plastic material.

SUMMARY OF THE INVENTION

In a preferred embodiment of the present invention, at least one of the nestable roof elements is immovably connected to the body. The other roof elements can be nested relative to said at least one immovable roof element. It is preferable in that regard if the immovable roof element is larger than the movable roof elements, with the movable roof elements being accommodable within said immovable roof element. The largest (immovable) roof element forms an adequate protection against the influence of the weather on the movable roof elements, in particular while the bus is driving.

A movable roof element is preferably movable along a guide element relative to the chassis. This makes it possible to move a movable roof element to the desired position in a relatively simple and guided manner along a guide. Although a guide is an excellent aid during said movement, the provision of a guide is not necessary, however. The movable roof elements might be simply detached from the bus body, for example, to be subsequently moved to a desired position in or on the bus, for example be carried to the storage location by persons.

In a preferred embodiment of the present invention, the body comprises at least one guide element, along which the movable roof element is guided upon being moved. The guide element on the body can cooperate with a guide element on a movable roof element, so that the movable roof element can be guided between a closed position and an open position of the roof in a simple manner through cooperation of the guides.

Alternatively, or additionally, the at least one guide element is provided on a further roof element, relative to which further roof element the movable roof element is nestable. In such a situation, a guide element on the movable roof element can cooperate with the at least one guide element on the further roof element, for example in the way a drawer cooperates with a cabinet in which the draw is slidably accommodated.

The guide element preferably comprises one or more rails extending in the longitudinal direction of the bus so as to make it possible to move a movable roof element in the longitudinal direction of the bus from the open position to the closed position of the roof.

In a preferred embodiment of the invention, an expandable seal is provided, at least in the closed position of the roof construction, between at least some of the parts of the roof construction that are movable relative to each other. Relative movability and sealing are opposing concepts. To obtain an adequate seal, for example against the passage of air or water, the seal must press firmly against the surfaces of an opening to be sealed, in the case of the bus two roof elements that are movable in parallel directions relative to each other. This, however, causes the resistance against movement of one part or both parts to increase. An expandable seal makes it possible on the one hand to expand the seal so as to obtain a proper abutment against the movable parts, and on the other hand to release the expansion so as to be able to move two mutually movable parts more easily relative to each other.

It is preferable in that regard if the expandable seal comprises at least one sealing element of an elastic material, which defines a fluid channel, wherein a fluid is present in the fluid channel, wherein the interior of the sealing element is impermeably sealed from the environment, at least to the fluid in question, and wherein pressure means are provided for increasing and decreasing the pressure of the fluid in said at least one sealing element. Seals between two movable parts often consist of an elongated strip of a resilient material, such as rubber, comprising an elongated hollow chamber. The material slightly adapts to the state of the opening to be sealed. As a result of the resilience of the material, however, the seal can be released in a relatively simple manner in case of an undesirably high load, for example during stormy weather, so that there is a risk of leakage. By increasing the internal pressure in the fluid channel as prescribed by the present invention, the resilience of the seal decreases and thus the quality of the seal increases.

The pressure means preferably comprise a compressor. The compressor may be a compressor of the bus engine, but according to another possibility a separate compressor may be provided for realising the seal. When the roof elements are to be moved relative to each other in the closed position, the sealing elements are in their expanded state and the compressor must be operated to release the pressure. Following that, the roof elements can be moved relative to each other.

In a preferred embodiment of the present invention, the bus comprises two or more movable roof elements, each provided with an associated guide element. If the number of movable roof elements of the bus is larger, a relatively larger part of the roof construction can be removed, at least if the roof elements are about the same length. When two roof elements are used, one being movable, approximately half the roof construction can be removed by nesting one movable roof element in the immovable roof element (or conversely). If three movable roof elements can be nested in an immovable roof element, approximately three quarters of the roof construction can be removed. Furthermore, relatively small roof elements are relatively easy to move. On the other hand, each next nestable, movable roof element needs to be smaller than the preceding one, and consequently a situation in which the space within the bus, i.e. the space covered by the smallest roof element, is limited by the presence of a (too) large number of roof elements must be prevented.

In a preferred embodiment of the present invention, a roof element comprises a roof part and two window parts, i.e. the base of the inverted U-shape of the roof construction comprises the roof part and the legs of the inverted U-shape comprise the window parts. Thus, the space above and beside the passenger spaces covered by the movable roof element in the closed position thereof can be cleared in one go by moving a movable roof element. Alternatively, the roof part of the roof element is movable in the longitudinal direction of the bus in a manner as described above, and window parts of the roof element are separate from the roof part so that they can be accommodated in the body in vertical direction, for example in a known manner similar to car windows of passenger cars. The presence of vertical guides for the windows above the body must preferably be prevented, not only because said vertical guides are vulnerable in the lowered position of the window parts, but also because passenger safety may be affected by their presence.

The bus is preferably suitable and approved for passenger transport on public roads. It is also conceivable to use a roof construction as described above with another type of passenger vehicle comprising ten or more seats for passenger transport, for example a railroad carriage, an amphibious vehicle or the like.

BRIEF DESCRIPTION OF THE DRAWINGS

The present invention will now be explained with reference to the appended drawings, in which:

FIG. 4b is a schematic, partially cutaway top view of the bus with the guide mechanism of FIG. 4a;

DETAILED DESCRIPTION OF THE INVENTION

Figure 1:
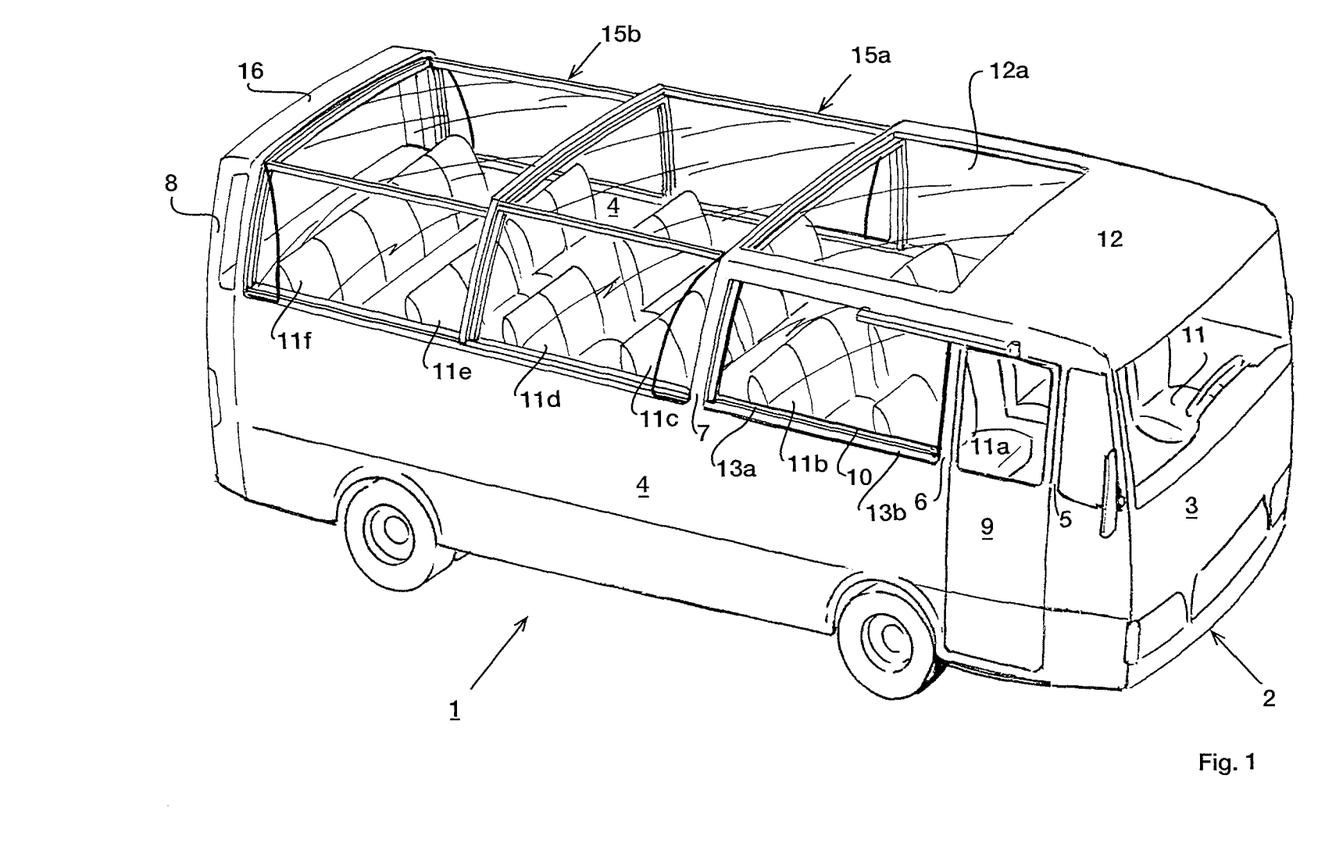
FIG. 1 is a perspective view of a first embodiment of a bus according to the present invention in a closed state thereof.

With reference now to FIG. 1, there is shown a passenger bus 1 having a body 2 comprising a front wall 3, two side walls 4 and a rear wall (not shown in the figures). The body has two A-pillars 5, two B-pillars 6, two C-pillars 7 and two Z-pillars 8. Present between the right-hand A-pillar 5 and B-pillar 6 is a door 9 via which passengers can get on and off. Disposed between the B-pillar 6 and the C-pillar 7 on each side is a conventional window 10. The bus 1 is provided with rows of seats 11*a*-*f* for passengers. The bus 1 further comprises the usual means known to the skilled person that enable the bus 1 to function, of course. Above the driver's seat 11 and the first row of seats 11*a*, near the window 10, part of a conventional roof 12 extends. The (part of a) conventional roof 12 is provided with a skylight 12*a*. The body 2 is further provided with guides 13*a*, 13*b*. The bus 1 has one immovable roof element, which is provided with a skylight 12*a* of a transparent plastic, and two movable roof elements 15*a*, 15*b*, which are made of a frame 14 with transparent plastic. At the rear end of the roof 12, seen in the driving direction, the roof 12 overlaps the roof element 15*a* over a short distance. Provided between the roof 12 and the roof element 15*a* is a seal (not shown in FIGS. 1 and 2), such that the roof element 15*a* is capable of sliding movement in part of the roof 12 and that a seal against weather influences, such as precipitation and wind, is provided in the closed position of the roof 12 and the roof elements 14, 15*a* as shown in FIG. 1. A comparable construction is provided between the roof element 15*a* and the roof element 15*b*. At the rear side, the roof element 15*b* sealingly abuts against the Z-pillars 8 and the roof part 16 present therebetween.

Figure 2:
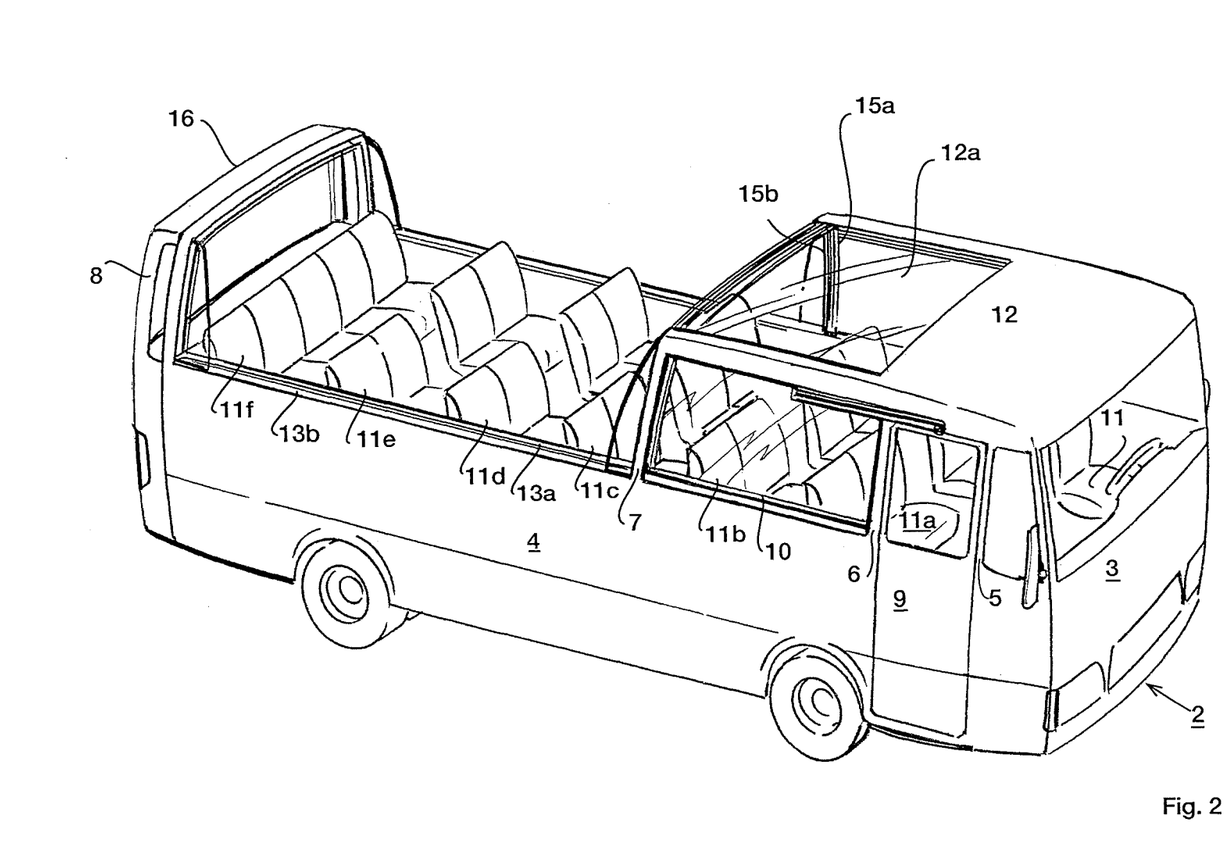
FIG. 2 is a perspective view of the bus of FIG. 1, in this case in an open state thereof.

FIG. 2 shows the bus 1 of FIG. 1. In FIG. 2, corresponding parts of the bus 1 are indicated by the same numerals as in FIG. 1. In FIG. 2, the bus 1 is shown with its roof construction in the open position. The roof element 15*b* has to that end been moved over the guide rail 13*b* from its original position (see FIG. 1) to a position under the roof element 15*a*. Subsequently, the two roof elements 15*a*, 15*b* have jointly been moved to a position under part of the roof 12. The seat rows 11*c*-11*f* are thus no longer covered. The seat rows 11*a* and 11*b* are covered by the roof 12 and the stored roof elements 15*a* and 15*b*. This position of the roof elements 15*a* and 15*b* is referred to as a non-covering position or state herein. After all, the seats 11*a* and 11*b* and the roof elements 15*a* and 15*b* are covered by the roof 12. Since the roof element 15*b* is smaller than the roof element 15*a*, and the roof element 15*a* is in turn smaller than the roof 12, the roof elements 15*a* and 15*b* do not experience any hindrance from the wind or the like while driving in the thus stored position shown in FIG. 2.

Figure 3A:
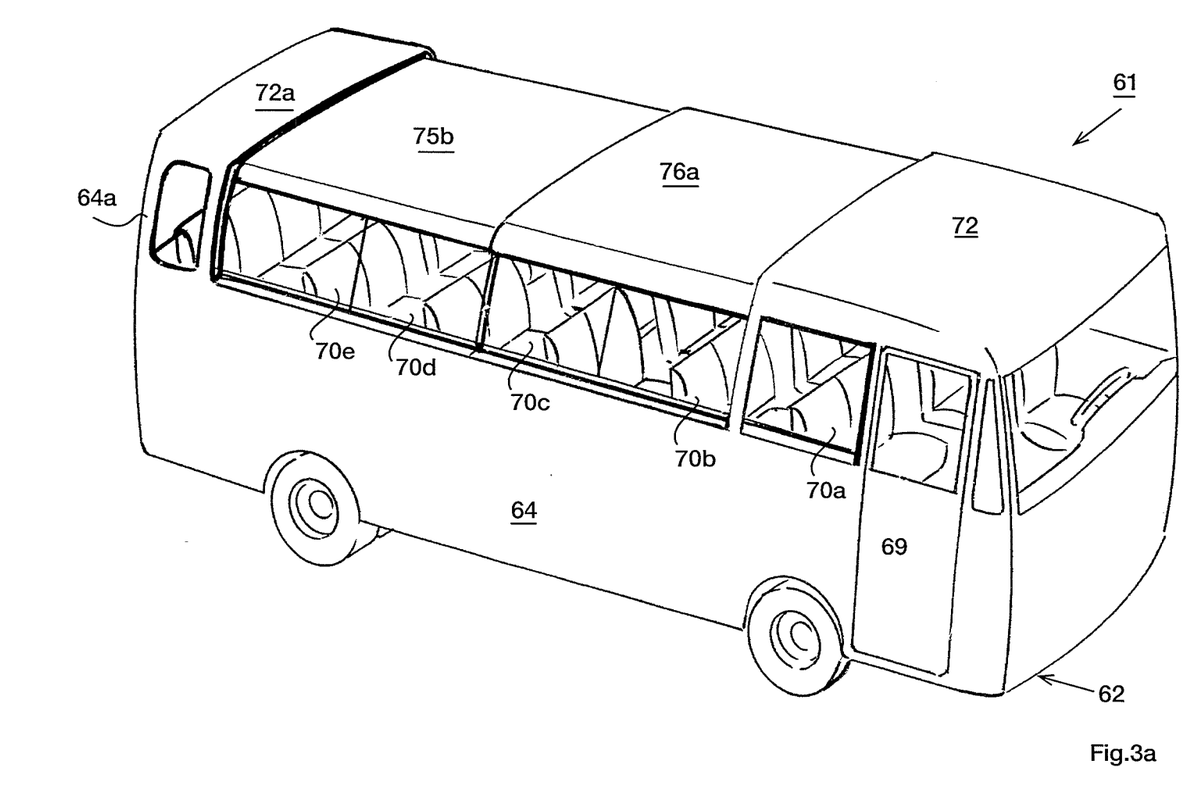
FIG. 3a is a perspective view of an alternative embodiment of a bus according to the present invention in a closed state thereof.
Figure 3B:
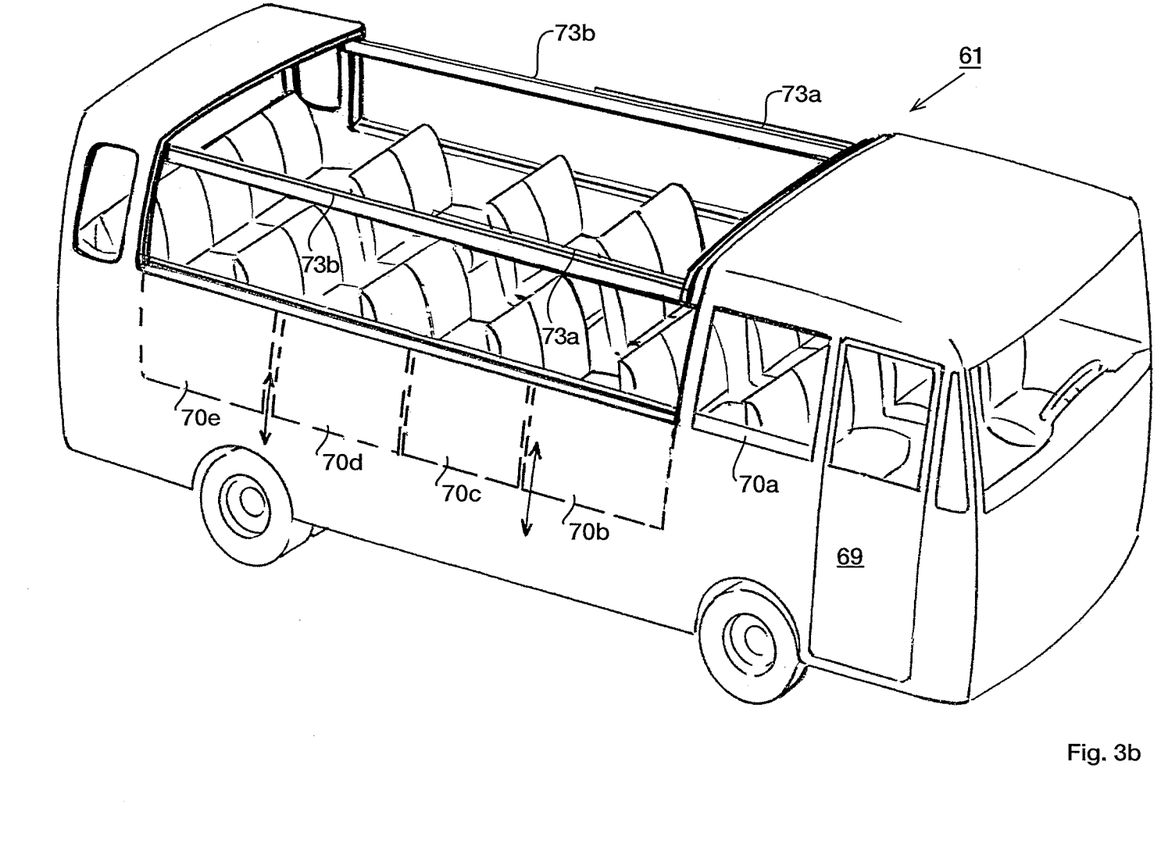
FIG. 3b is a perspective view of the bus of FIG. 3a, in this case in an open state thereof.

FIG. 3*a* shows an alternative embodiment of a bus 61 according to the present invention. The bus 61 exhibits a great deal of similarity to the bus 1 shown in FIGS. 1*a*, 1*b*. The body 62 is comparable to that of the bus 1 of FIGS. 1*a* and 1*b*, with this difference that the bus 61 has rear side wall parts 64*a* and a roof part 72*a* at the rear. FIG. 3*a* shows the bus 51 in the closed state, whilst FIG. 3*b* shows the bus 61 with its open roof construction in an open state. As FIG. 3*b* shows, the guides 73*a*, 73*b* are positioned higher than the guides of the bus 1. Furthermore, two movable roof elements 75*a*, 75*b* are provided, which roof elements are made of an opaque plastic. In this embodiment, the roof elements 75*a* and 75*b* can be accommodated practically in their entirety, because the roof elements 75*a*, 75*b* have no side wall, or at least practically no side wall, so that they can be moved to a position under the roof 72 in the front of the bus 1 without obstructing access through the door 69 to the passengers. With the bus 1, on the contrary, such would be the case. As a result, one additional row of seats, i.e. the row of seats 71*b*, can be cleared by the movable roof elements 75*a*, 75*b* in the bus 61 in comparison with the bus 1, in which the roof elements cannot move beyond the B-pillar 6. The windows 70*b*, 70*c*, 70*d* and 70*e* can be accommodated in the spaces in the side wall 64 that are intended for that purpose, as is known with conventional passenger cars, in particular of the convertible type.

Figure 4A:
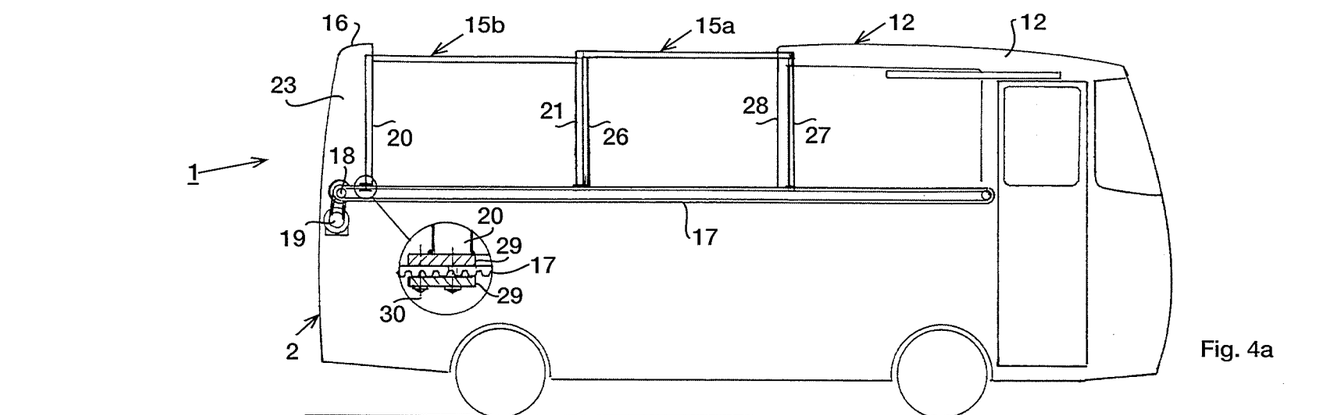
FIG. 4a is a schematic, cutaway side view of the bus with a guide mechanism for the roof elements of the bus of FIG. 1.
Figure 4B:
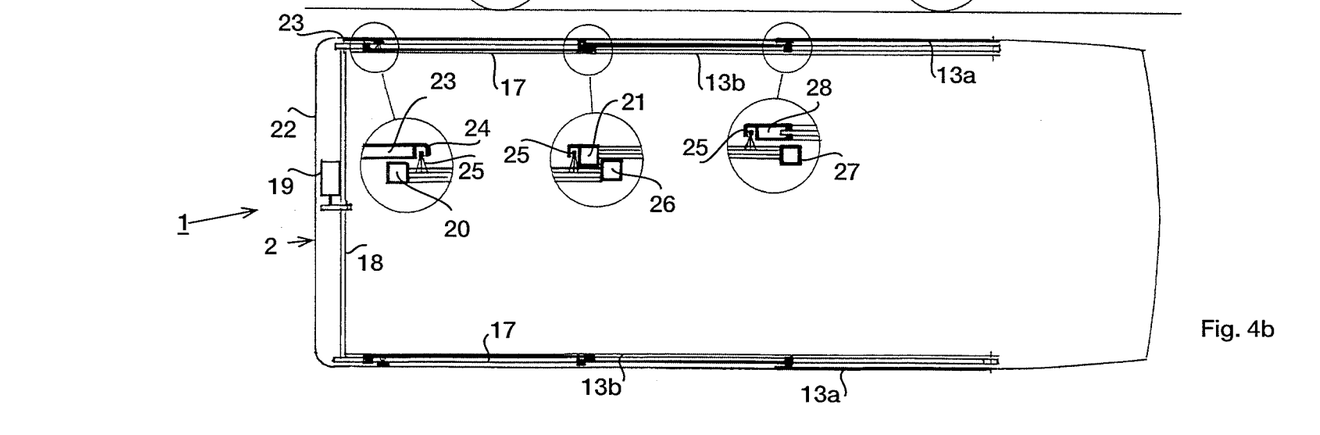

FIGS. 4*a* and 4*b* show a schematic and partially cutaway side view and top view, respectively, of the bus 1 of FIG. 1 (in the closed state), by way of illustration of the way the roof elements 15*a*, 15*b* are guided relative to the body 2. The roof elements 15*a* and 15*b* are supported in guides 13*a*, 13*b*, which extend in the longitudinal direction of the bus 1. Under said joint guides 13, an endless conveyor 17 extends, which is driven by an electric motor 19 via a drive shaft 18. Said conveyor 17 is connected to a pillar 20 of the rear roof element 15*b* and as such keeps the roof elements 15*a* and 15*b* in their locked position. The encircled detail view of FIG. 4*a* shows that the conveyor 17 is clamped down by two fixing elements 29 connected to bolts 30, which fixing elements are attached to the rear pillar 20 of the rear roof element 15*b*. When the drive shaft 18 is driven in clockwise direction by the electric motor 19 in FIG. 4*a*, the upper part of the conveyor 17 moves to the right in FIG. 4*a*, carrying along the pillar 20 connected thereto. The rear roof element 15*b* thus moves toward the front of the bus 1. The roof element 15*a* remains in the position shown in FIG. 1*a* for the time being until the pillar 20 comes into contact with the pillar 21 of the roof element 15*a*, thus pushing the roof element 14 toward the front of the bus 1 as well. The roof element 15*b*, which has entirely or substantially entirely moved under the roof element 15*a*, thus moves under the roof 12 together with the roof element 15*a*. When the two roof elements 15*a*, 15*b* have thus moved entirely or substantially entirely under the roof 12, the electric motor 19 is stopped and the conveyor 17 keeps the pillar 20, and thus the roof elements 15*a* and 15*b*, positioned under the roof 12.

The rear wall 22 of the body 2 of the bus 1 extends with its flank parts 23 from the rear of the bus to the front over a small distance on two sides. Each flank part 23 slightly overlaps the roof element 15*b*, so that the pillars 20 are positioned beside the flank parts 23. At its front end, the flank part 23 is provided with a recess 24, in which a sealing element 25 as known per se for sliding panels is provided. A comparable interaction takes place between the element 15*a* with the pillar 21 and the roof element 15*b* with the pillar 26, beside which pillar 21 a sealing element 25 is provided. A sealing element 25 is also provided between the pillar 27 of the roof element 15*a* and the pillar 28 that connects the rear part of the roof 12 to the part of the body 2 of the bus 1 that is located thereunder.

Figure 5A:
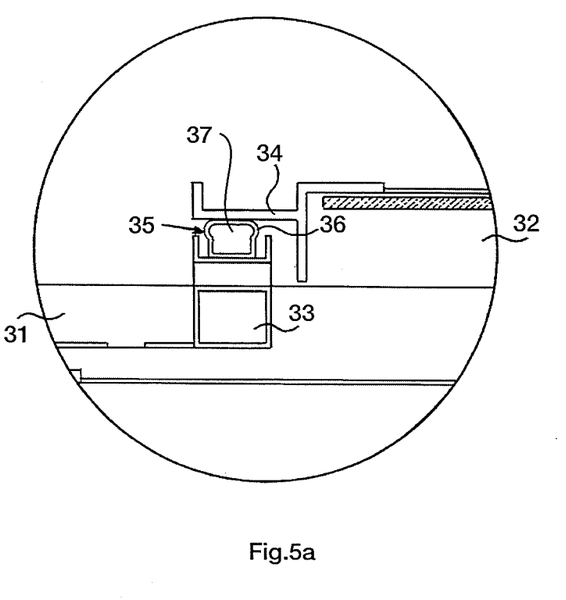
FIGS. 5a and 5b show an alternative embodiment of the seal as shown in the encircled, larger-scale detail of FIG. 4b in two different states thereof.
Figure 5B:
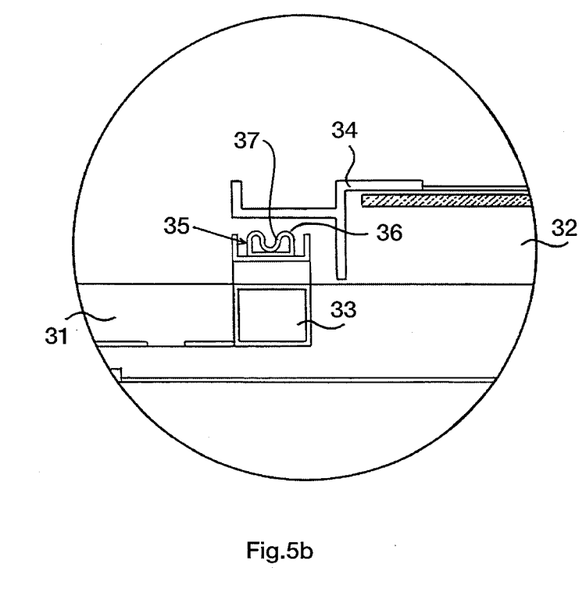

FIGS. 5*a* and 5*b* show an alternative seal between two adjacent roof elements to the seal shown in FIG. 4*b*. A wall part 31 of an outer roof element, in this case a rear roof element that is fixedly connected to the body, overlaps a movable wall part 32 of an inner roof element in FIGS. 5*a*, 5*b*. Of the wall part 31, a pillar 33 is shown, which pillar is located near an end section 34 of the movable wall part 32. In this state, the roof of the bus is closed. In FIG. 5*a*, an expandable sealing element 35 formed by a rubber wall 36 that forms a non-air permeable envelope of the hollow air channel 37 is in an expanded state. The air pressure in the hollow chamber ranges between 1.25 and 2.5 bar, preferably 2.0 bar. The rubber wall 36 firmly presses against the end section of the movable wall part 32 on the side remote from the pillar 33. Thus the sealing element 35 not only seals the space between the two wall parts 31, 32, but it also offers resistance against movement of the movable wall part 32 with respect to the fixed wall part 31.

When the cover of the bus is to be opened, air is sucked from the hollow air chamber 37 by a compressor (not shown) until the prevailing pressure in the air channel 37 is lower than 1 bar, so that the part of the rubber wall 36 remote from the pillar 33 is pushed inwards by the higher ambient pressure.

Thus, the contact between the wall parts 31 and 32 is released, and the movable roof element, of which the wall part 32 forms part, can be removed in a simple manner. A separate locking arrangement for the movable roof element may be provided, for example in a conveyor for the roof elements, with the sealing element 35 providing additional locking. While the operation of the seal in FIGS. 5a, 5b is shown for a fixed and a movable roof element, it is equally well possible to use such a seal with two movable roof elements.

Figure 6A:
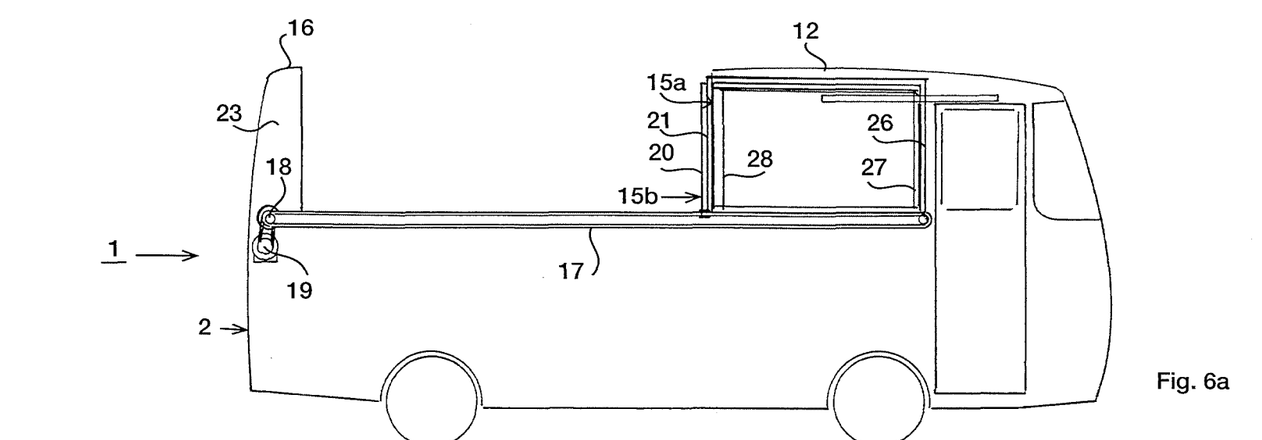
FIG. 6a shows the bus of FIG. 4a with the roof open.
Figure 6B:
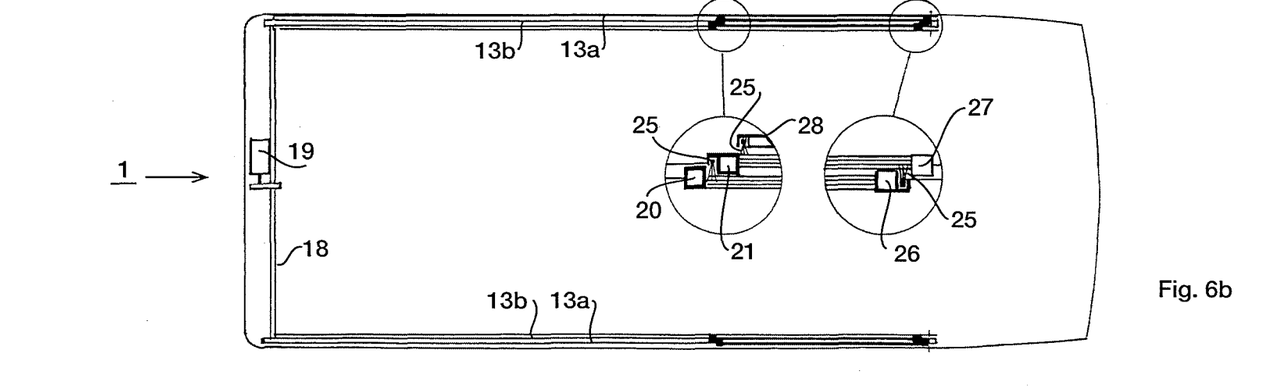
FIG. 6b shows the bus of FIG. 4b with the roof closed.

Referring now to FIGS. 6a and 6b, there is again shown a schematic and partially cutaway side view and top view, respectively, of the bus 1 of FIGS. 4a and 4b, in this case with an open roof, however, i.e. with the roof elements 15a, 15b in the stored position. The fixing element 29 is still positioned under the pillar 20, of course, which pillar is connected to the conveyor 17 via the fixing element 29. In the insets of FIG. 6b, the position of the sealing elements 25 relative to the pillars 26, 27 and 20, 21, 28, respectively, is shown. When the bus 1 is to be converted again from the state shown in FIGS. 6a, 6b to the closed state, the electric motor, 19 is driven in the reverse direction so as to rotate the drive shaft 18 (in FIG. 4) in anticlockwise direction. Thus, the upper part of the conveyor 17 will move rearwards, carrying along the pillar 20 via the fixing element 29, and the roof element 15b will move to the rear, whilst initially, the roof element 15a will remain stored under the roof 12. At some point the pillar 26 will come into contact with the pillar 21, and the pillar 21, and thus the roof element 15a, will be carried along with the pillar 26. When finally, the pillar 20 has returned to the position shown in FIGS. 4a, 4b, the roof of the bus 1 will be closed and the electric motor 19 will be deactivated. The roof elements 15a, 15b are now locked in the covering position.

Figure 7A:
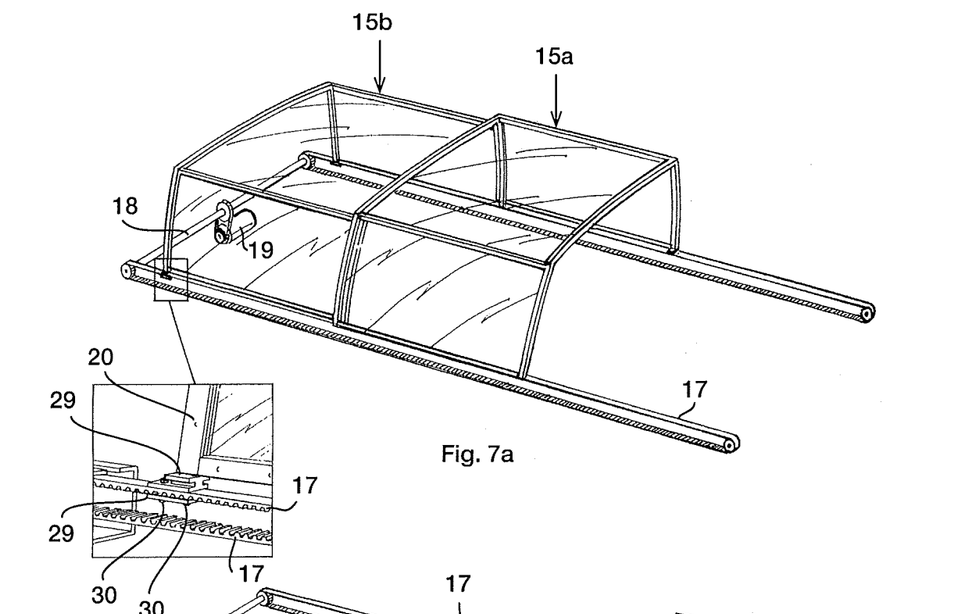
FIGS. 7a and 7b are perspective views of a guide arrangement for use in the bus of FIG. 1.
Figure 7B:
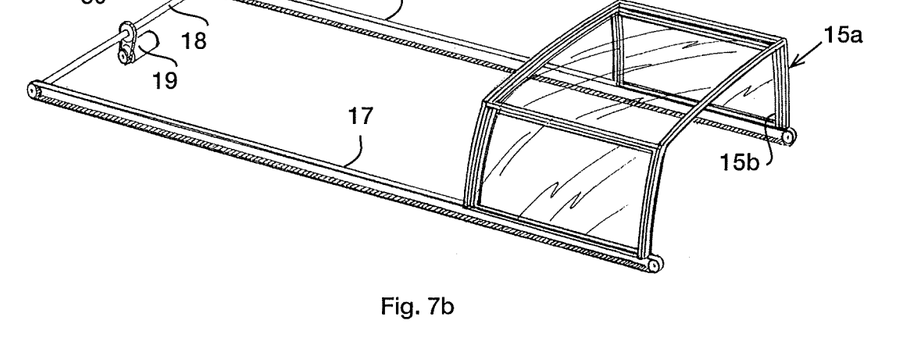

FIGS. 7a and 7b show the above-described movements of the roof elements 15a, 15b, whilst the body of the bus is not shown. In FIGS. 7a and 7b corresponding parts are indicated by the same numerals as in FIGS. 4 and 6. Since the discussion of FIGS. 4 and 6 is sufficiently clear, it will not be repeated with regard to FIGS. 7a and 7b.

Figure 7C:
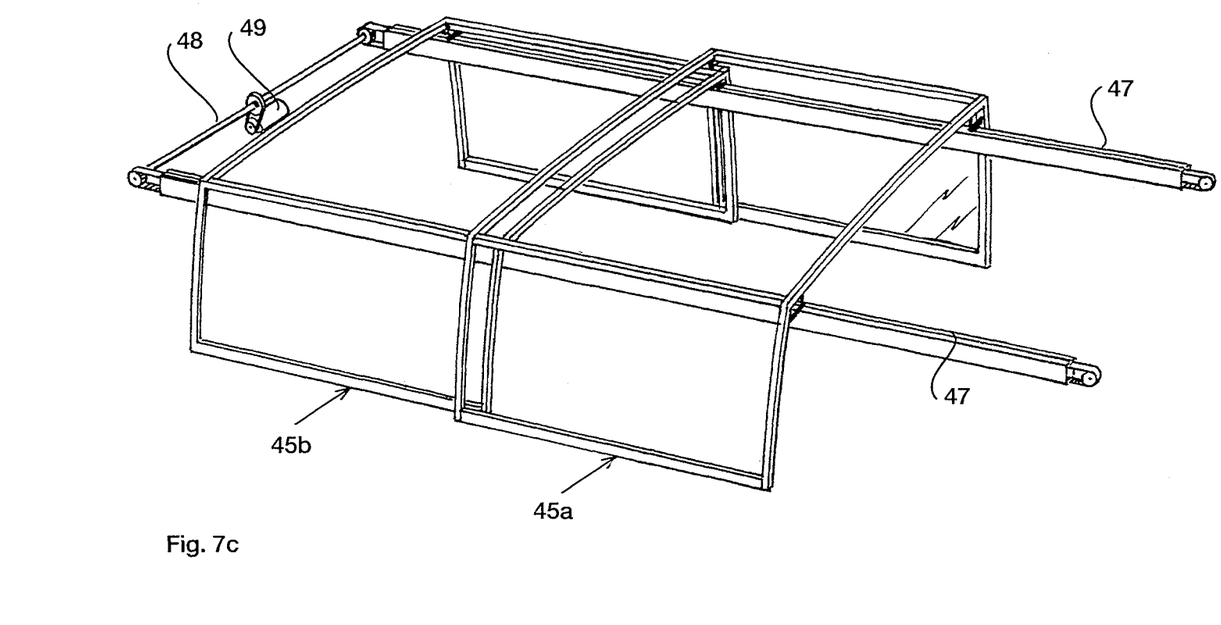
FIG. 7c is a perspective view of a guide arrangement for use in a bus as shown in FIGS. 3a, 3b.

FIG. 7c shows an alternative embodiment of a driving mechanism for roof elements 45a, 45b of a bus comparable to the bus shown in FIG. 2, which roof elements 45a, 45b, in contrast to the roof elements of the bus 61 shown in FIG. 3, comprise window elements. The driving mechanism of the roof elements 45a, 45b is positioned at the top of a bus, however, so that the roof elements 45a, 45b are, at least partially, supported on the endless conveyor belts 47, which are driven by the electric motor 49 via the drive shaft 48. The roof elements 45a, 45b comprise guide elements (not shown) at the bottom side, which guide elements cooperate with a guide on the body of a bus or other vehicle. Instead of providing the two conveyors 47, it is also possible to provide one central conveyor in or near the centre of the roof elements 45a, 45b, so that the roof elements 45a, 45b are supported on a conveyor and the body of a bus.

In the figures and the description the present invention has been shown and described on the basis of a few embodiments thereof. It will be understood, however, that many variants, which may or may not be obvious to the skilled person, are conceivable within the scope as defined in the following claims. Thus, guides of a different type may be provided at different positions. The roof elements need not be driven, or be movable via guides, but they may also be carried by hand between a covering and a non-covering position or be moved otherwise. The roof elements may also be nestable at the rear of the bus or even in the middle of the bus rather than in the front of the bus. The number of movable roof elements may alternatively be 1, 3, 4 or even more. The roof elements may be entirely or partially made of a material other than a plastic material, for example of glass or another transparent of even non-transparent material. Locking the roof elements can be done in many different ways with or without interaction with any guides. Instead of being guided in separate guides, the roof elements may also be guided in a common guide, etc.

The invention claimed is:

1. A hardtop bus having at least ten seats, comprising a chassis and a body with a U-shaped roof construction, the body including spaced A pillars, B-pillars and C-pillars wherein the passenger compartment is situated between the B-pillars and the C-pillars, wherein:
the U-shaped roof construction is positioned between the B-pillars and the C-pillars and covers and runs alongside at least some of the seats of the bus, and is configured to be retractable over at least some of the at least ten seats such that the U-shaped roof construction has an open and closed position,
the U-shaped roof construction comprises at least two shape retaining, nestable roof elements having a U-shaped cross-section, which are configured to be movable relative to each other and are configured to be positioned one behind another in the closed position, wherein:
each nestable roof element includes a window along a sidewall of the nestable roof element;
a first window of a nestable roof element is configured to align with a second window of a second nestable roof element to maintain visibility through the first and second windows of the first and second nestable roof elements when the nestable roof elements are in the open and closed positions; and
at least one of the at least two shape retaining roof elements includes a roof portion and two windows.

2. The bus according to claim 1, further comprising at least one nestable roof element that is immovably connected to the body.

3. The bus according to claim 1, wherein at least one of the at least two shape retaining, nestable roof elements is movable along a guide element relative to the chassis.

4. The bus according to claim 3, wherein the body comprises at least one guide element, along which the at least one of the at least two shape retaining, nestable roof elements is guided upon movement thereof.

5. The bus according to claim 3, wherein the guide element comprises a rail extending in the longitudinal direction of the bus.

6. The bus according to claim 1, wherein an expandable seal is provided between at least some of the parts of the U-shaped roof construction that are movable relative to each other.

7. The bus according to claim 1, the U-shaped roof construction is supported above partial sidewalls of the body alongside lower portions of the at least some of the seats of the bus.

8. The bus according to claim 1, wherein the nestable roof elements are arranged to have a graduated, decreasing size such that the nestable roof element in the rear of the bus is the smallest nestable roof element.

9. The bus according to claim 1, wherein each nestable roof element comprises a frame with two side windows positioned opposite and parallel to one another positioned in the frame and a third window positioned in the frame that is perpendicular relative to the two side windows, wherein:
the third window is configured for overhead viewing from the bus while in the closed position.

* * * * *